United States Patent [19]
Ben-Matitayhu et al.

[11] Patent Number: 5,795,395
[45] Date of Patent: Aug. 18, 1998

[54] CAKE DECORATING SYSTEM AND METHOD

[76] Inventors: Ruth Ben-Matitayhu, David Meretz 13, Ramat Sharett, 96905 Jerusalem, Israel; Boris Sverdlov, Shmuel Rodensky 29; Ilena Brailovski, Masada 190, both of Beersheva, Israel

[21] Appl. No.: 813,215

[22] Filed: Mar. 7, 1997

[51] Int. Cl.⁶ .................................... B05C 5/00
[52] U.S. Cl. .................. 118/712; 118/13; 118/14; 118/24
[58] Field of Search .................. 118/712, 13, 14, 118/24; 364/167.01; 101/129

[56] References Cited

U.S. PATENT DOCUMENTS

| | | |
|---|---|---|
| D. 275,723 | 10/1984 | Leininger . |
| 4,502,380 | 3/1985 | Meador ................. 101/38.1 |
| 4,531,292 | 7/1985 | Pasternak ............... 33/18.1 |
| 4,670,271 | 6/1987 | Pasternak ............... 426/90 |
| 4,718,017 | 1/1988 | Hutton et al. .......... 364/470.04 |
| 4,910,661 | 3/1990 | Barth et al. ........... 364/167.01 |
| 5,017,394 | 5/1991 | Macpherson et al. ..... 426/302 |
| 5,505,775 | 4/1996 | Kitos ..................... 118/14 |

*Primary Examiner*—Laura Edwards
*Attorney, Agent, or Firm*—Needle & Rosenberg, P.C.

[57] ABSTRACT

An apparatus and method for decorating a cake. A print head is provided that moves in a planar or linear domain and that dispenses edible colorant at positions corresponding to the pixels of a digital image. The cake is positioned parallel to the domain and displaced vertically from the domain by an appropriate displacement. The proper positioning of the cake is facilitated by a sensing mechanism for sensing the attitude of the cake with respect to the domain and a leveling mechanism, responsive to the sensing mechanism, for adjusting that attitude. A preferred sensing mechanism includes laser sources aimed at photodiode detectors: when the cake is properly positioned, the beams of light from the lasers are partially blocked. A preferred leveling mechanism includes adjustable legs supporting the table whereon the cake is placed under the print head.

14 Claims, 7 Drawing Sheets

CAKE DECORATING SYSTEM AND METHOD

FIELD AND BACKGROUND OF THE INVENTION

The present invention relates to a system and method for decorating a cake and, more particularly, to a system and method for applying, to the top of a cake, an edible copy of an image stored in digital form.

Several automatic cake decorating systems are known in the art. One such system is described in U.S. Pat. No. 5,505,775, to Kitos, which is incorporated by reference for all purposes as if fully set forth herein. The object of Kitos' invention is to provide a cake decorating system that is simpler than those known previously. In Kitos' system, a digitally stored image is transferred to the top of a cake using a print head that includes a drop-on-demand colorant expulsion system having three food coloring reservoirs containing edible colorants and a nozzle plate through which the colorants are ejected onto the top of the cake. The drop-on-demand system includes components common with the Hewlett Packard 500C Desk Jet Color Printer. The print head is moved above the top of the cake by a three axis system including one vertical (z) axis and two lateral (x,y) axes. Each (x,y) printing position corresponds to one pixel of the digitally stored image. A proximity sensing means is used to measure the position of the print head relative to the top of the cake at every (x,y) printing position, and the elevation (z) of the print head is adjusted to keep it at an optimum height between 0 and 15 cm above the top of the cake.

The Kitos system relies on the accurate alignment and rigidity of the three axis system to preserve image fidelity. The arm that supports the print head and enables motion in the y-direction, the stanchion that supports the arm and enables motion in the z-direction, and the slide assembly that supports the stanchion and enables motion in the x-direction, all must be mutually perpendicular. Any departure from perpendicularity, and any play in the mutual alignment of the arm, the stanchion and the slide assembly, is reflected in a noticeable deterioration in the quality of the picture on the surface of the cake. With continued use, both the alignment and the rigidity of Kitos' system tends to deteriorate. Furthermore, Kitos' device is capable of decorating cake surfaces that tilt with respect to the horizontal by only up to 15°.

There is thus a widely recognized need for, and it would be highly advantageous to have, an automatic cake decorating system as simple as those known in the prior art, particularly Kitos' system, but that is more resistant to print head misalignment and therefore reproduces a truer copy of the digital image on the top of the cake. Preferably, the system also would be able to print on cake surfaces that are tilted by more than 15°, for example, the top surfaces of roll cakes.

SUMMARY OF THE INVENTION

According to the present invention there is provided an apparatus for decorating a cake having a top surface, comprising: (a) a print head; (b) a positioning mechanism for positioning the print head at a plurality of lateral positions, the plurality of positions defining a domain wherewithin the print head moves; (c) a support mechanism for supporting the cake below the domain, the support mechanism including a leveling mechanism for adjusting the support mechanism so that at least a portion of the top surface of the cake is substantially parallel to the domain and displaced from the domain by a certain displacement; and (e) a sensing mechanism for sensing the whether the portion of the top surface of the cake is substantially parallel to the domain and displaced from the domain by the displacement, the leveling mechanism being responsive to the sensing mechanism.

According to the present invention there is provided a method for decorating a cake having a top surface, comprising the steps of: (a) providing a print head positionable at a plurality of lateral positions, the plurality of positions defining a domain wherewithin the print head moves; (b) positioning the cake with at least a portion of the top surface of the cake substantially parallel to the domain and below the domain by a certain displacement; and (c) at each of the plurality of lateral positions, applying at least one edible colorant to the top surface of the cake, using the print head.

According to the present invention, the print head moves only laterally. With only two degrees of freedom, it is easier to keep the arm along which the print head moves, and the track along which the arm moves, mutually and rigidly perpendicular, than it is to keep the elements of Kitos' system mutually and rigidly perpendicular in three dimensions. Vertical motion is provided by moving the cake vertically and tilting the cake to keep its top surface parallel to, and correctly distanced from, the planar domain within which the print head moves. A sensing mechanism is provided to detect departures of the top of the cake from this parallel and correctly distanced attitude. The trade-off is that only cakes whose top surfaces either are flat or cylindrical can be accommodated by the apparatus of the present invention. Nevertheless, cylindrical cakes can be accommodated to a greater extent by the apparatus of the present invention than by Kitos' device. The tilting motion provided by the apparatus of the present invention constitutes two orientational degrees of freedom in addition to Kitos' three translational degrees of freedom. As a result, the apparatus of the present invention is capable of decorating a cake whose top surface is inclined to the horizontal by as much as 45°.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a cake decorating system and method which can be used to apply an edible rendition of a digital image to the top surface of a cake with higher fidelity than presently known systems.

The principles and operation of cake decoration according to the present invention may be better understood with reference to the drawings and the accompanying description.

Figure 1:
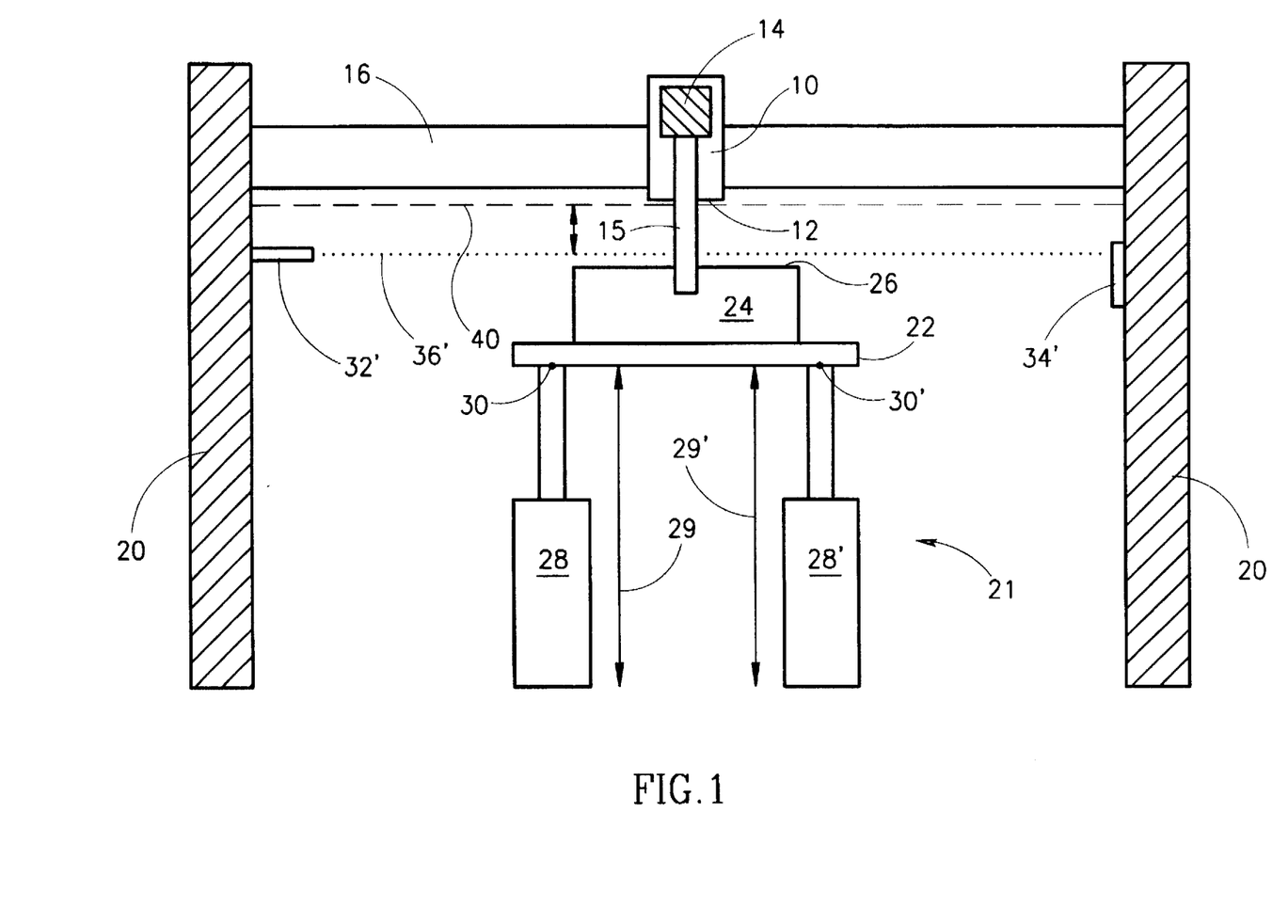
FIG. 1 is a frontal schematic view of a first embodiment of the apparatus of the present invention.
Figure 2:
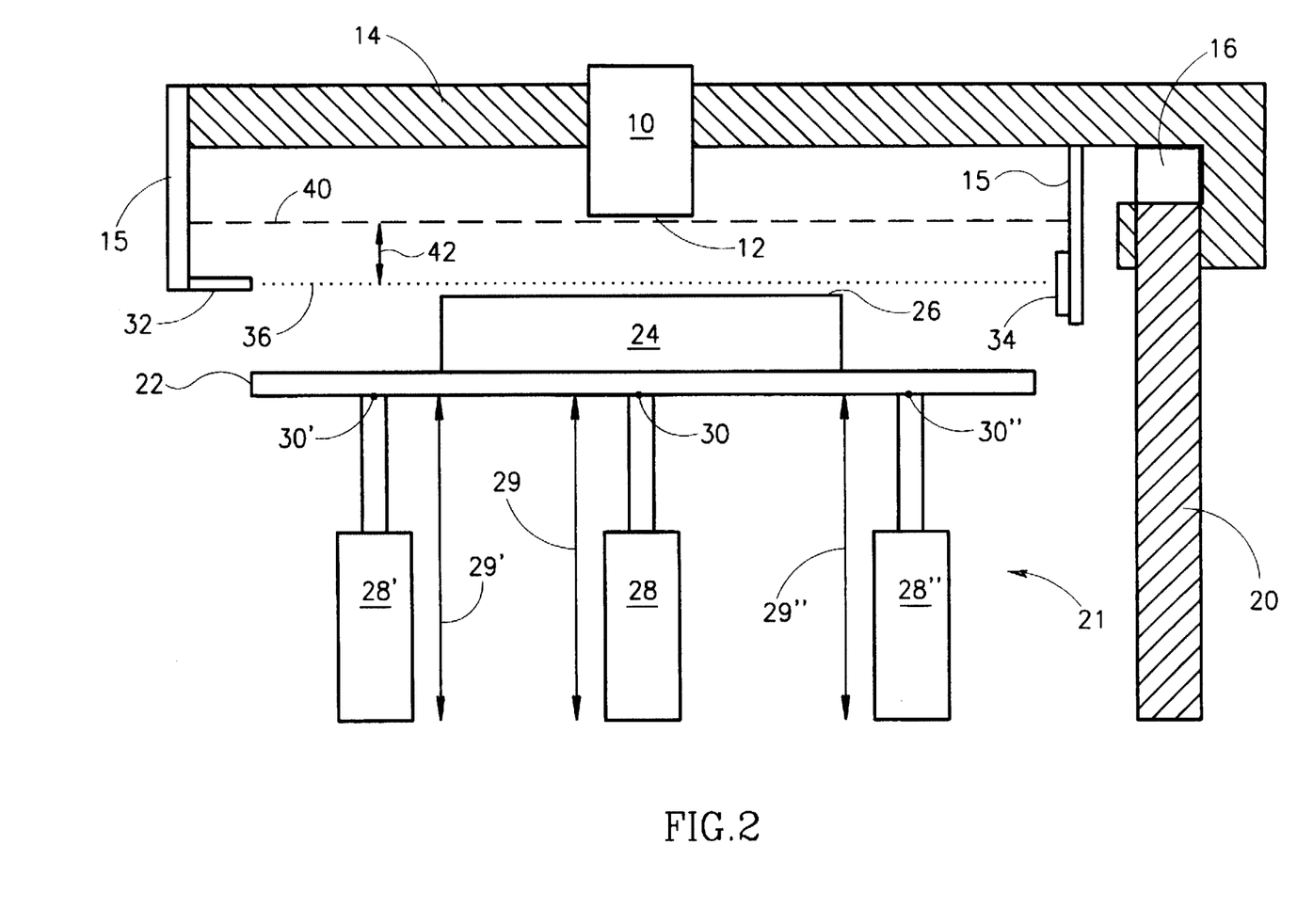
FIG. 2 is a partial side schematic view of the apparatus of FIG. 1.
Figure 3:
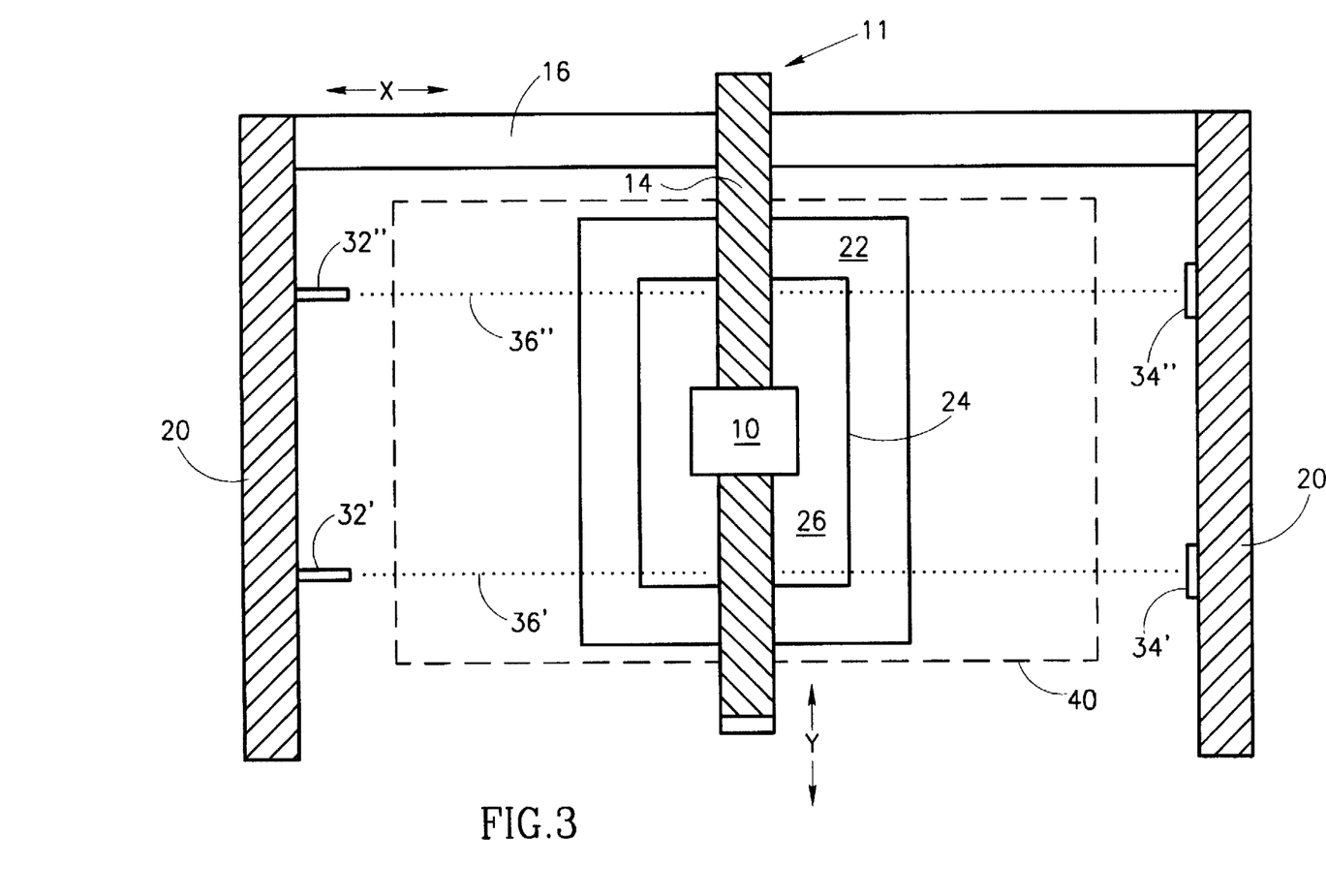
FIG. 3 is a top schematic view of the apparatus of FIG. 1.

Referring now to the drawings, FIG. 1 is a frontal schematic view of a first preferred embodiment of a cake decorating apparatus according to the present invention; FIG. 2 is a partial side schematic view of the apparatus of FIG. 1; and FIG. 3 is a top schematic view of the apparatus of FIG. 1. A print head 10, substantially identical to the print head of Kitos, is supported by a positioning mechanism 11 that is in turn supported by a rigid frame 20. Positioning mechanism 11 is depicted schematically in FIGS. 1–3 as including a y-motion arm 14 and an x-motion arm 16. Print head 10 is movably attached to y-motion arm 14 and is moved along y-motion arm 14 in the y-direction. y-motion arm is movably attached to x-motion arm 16 and is moved along x-motion arm 16 in the x-direction. Conceptually, y-motion arm 14 corresponds to Kitos' traveling arm and x-motion arm 16 corresponds to Kitos' precision slide assembly. In fact, Kitos' arrangement may be used as positioning mechanism 11 if Kitos' vertical support stanchion is removed and Kitos' traveling arm is attached directly to Kitos' bearing block which slides along Kitos' precision slide assembly. It will be appreciated, however, that any suitable mechanism for moving print head 10 laterally in the x and y directions may be used.

Positioning mechanism 11 serves to position print head 10 laterally, at positions corresponding to the pixels of a digital image to be applied to a top surface 26 of a cake 24. The rectangular domain of points within which the bottom surface 12 of print head 10 may be placed by positioning mechanism 11 is represented by a dashed line 40. Cake 24 is supported by a support mechanism 21 so that, at any time during the application of edible colorants to top surface 26, the portion of top surface 26 that lies below print head 10 is parallel to domain 40 and below domain 40 by a displacement 42 of between about 0.2 mm and about 0.5 mm. Support mechanism 21 includes a table 22 on which cake 24 rests, and three legs 28, 28' and 28" having adjustable lengths 29, 29' and 29" respectively. Legs 28, 28' and 28" are pivotably attached to table 22 at attachment points 30, 30' and 30" respectively. Legs 28, 28' and 28" constitute a leveling mechanism: lengths 29, 29' and 29" are adjusted, in a manner described below, to position the portion of top surface 26 that lies below print head 10 parallel to domain 40 and below domain 40 by displacement 42.

The attitude of top surface 26 with respect to domain 40 is sensed by a sensing mechanism 31 that includes three sources 32, 32' and 32" of pulsed and collimated beams 36, 36' and 36" of light, and three detectors 34, 34' and 34" that respond to incident light. In the context of the present invention, the term "light" includes all electromagnetic radiation of a wavelength short enough so that beams 36, 36' and 36" can be collimated precisely enough to be used to sense the attitude of top surface 26 with respect to domain 40, for example, visible radiation or infrared radiation. Preferably, sources 32, 32' and 32" are lasers and detectors 34, 34' and 34" are photodiodes. Source 32 and detector 34 are rigidly attached to extensions 15 of y-motion arm 14 so that source 32 aims beam 36 at detector 34, with beam 36 parallel to domain 40 and below domain 40 by displacement 42. Similarly, sources 32' and 32" and detectors 34' and 34" are rigidly attached to frame 20 so that source 32' aims beam 36' at detector 34' and source 32" aims beam 36" at detector 34", with beams 36' and 36" parallel to domain 40 and below domain 40 by displacement 42. For clarity, only the rightmost portion of frame 20, that supports x-motion arm 16, is shown in FIG. 2.

Figure 4:
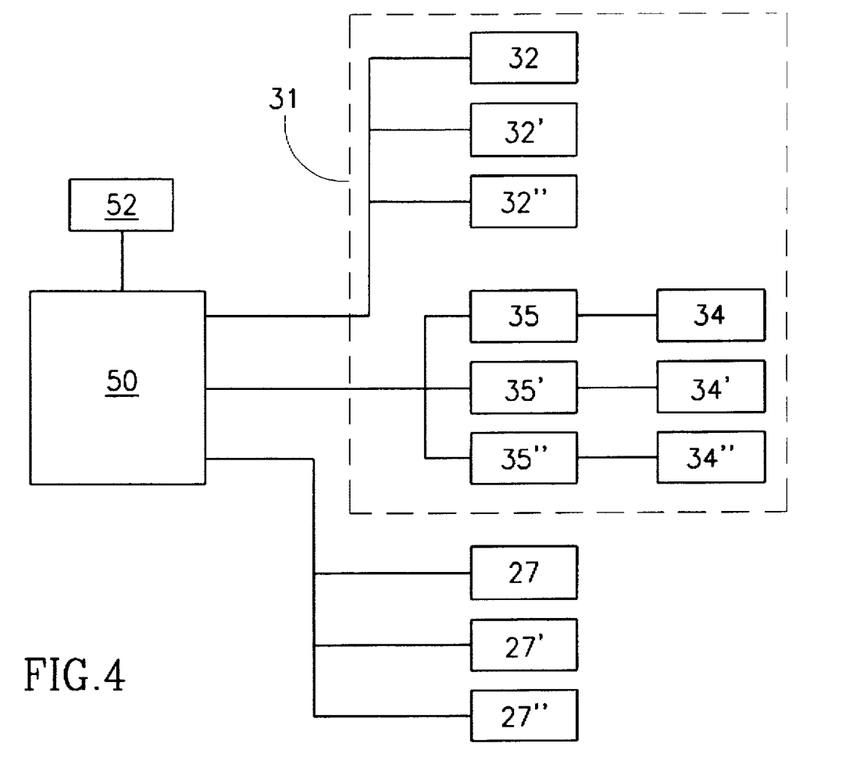
FIG. 4 is a block diagram of the system, in the apparatus of FIG. 1, for positioning the cake vertically.
Figure 5:
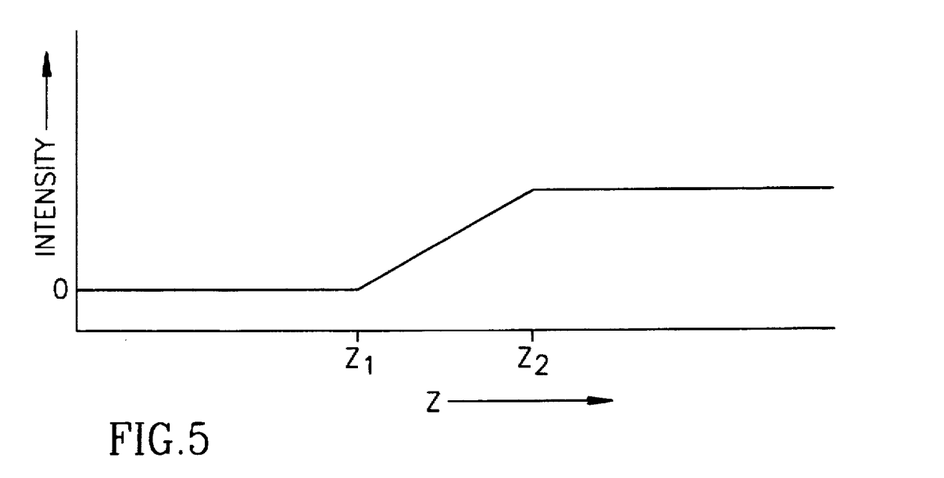
FIG. 5 is a graph of detected intensity vs. the depth of the top surface of the cake below the domain of positions of the lower surface of the print head.

FIG. 4 is a block diagram of the system that senses and adjusts the attitude of top surface 26 of cake 24. Sources 32, 32' and 32", detectors 34, 34' and 34", and legs 28, 28' and 28" are connected by suitable electrical connections to a control system 50 that receives its electrical power from a power supply 52. Note that detectors 34, 34' and 34" are connected to control system 50 via amplifiers 35, 35' and 35" respectively. Control system 50 activates stepping motors 27, 27' and 27" in legs 28, 28' and 28" respectively to adjust lengths 29, 29' and 29" so that cake 24 partially blocks beams 36, 36' and 36": length 29 is adjusted by motor 27 in response to the signal from detector 34, length 29' is adjusted by motor 27' in response to the signal from detector 34', and length 29" is adjusted by motor 27" in response to the signal from detector 34". FIG. 5 is a schematic graph of the intensity of light received by detector 34, for example, as a function of the depth z below domain 40 of the portion of top surface 26 that is intersected by a vertical plane including beam 36 so that the underlying portion of cake 24 intercepts beam 36 when table 22 is suitably elevated. Going from right to left in FIG. 5, i.e., starting from a low position of table 22 and raising table 22, at large values of z, beam 36 is not blocked, so detector 34 receives the full intensity of beam 36. Because beam 36 has a finite width, as z decreases (i.e., as table 22 rises) past the value of z, labeled as "$z_2$", at which top surface 26 reaches the lowest part of beam 36, the intensity does not drop abruptly to zero, but rather decreases linearly with decreasing z, until all of beam 36 is blocked by cake 24, at a value of z labeled as "$z_1$". Preferably, source 32 and detector 34 are positioned so that displacement 42 is equal to the arithmetic mean of $z_1$ and $z_2$: when cake 24 blocks half of the intensity of beam 36, the corresponding portion of top surface 26 is below domain 40 by displacement 42.

To use the apparatus of FIGS. 1–5 to decorate cake 24, legs 28, 28' and 28" are adjusted to their shortest lengths 29, 29' and 29" and cake 24 is placed on table 22. Sources 32, 32' and 32" are turned on. At this point, detectors 34, 34' and 34" are receiving the full intensities of beams 36, 36' and 36" respectively. y-motion arm 14 is positioned so that print head 10 is at one or the other side of cake 24, at either the largest x-coordinate or the smallest x-coordinate of top surface 26 to be decorated. Legs 28, 28' and 28" are extended by activating motors 27, 27' and 27" until the intensity received by one of detectors 34, 34' and 34" is equal to half of the original received intensity, indicating that a corresponding portion of top surface 26 now is at a point displaced from domain 40 by displacement 42. The corresponding motor 27, 27' or 27" is deactivated. The other two motors continue to extend the corresponding legs until the intensity received by a second of detectors 34, 34' or 34" is equal to half of the original received intensity, indicating, as before, that a corresponding second portion of top surface 26 now is at a point displaced from domain 40 by displacement 42. As before, the corresponding motor 27, 27' or 27" is deactivated. In general, the first portion of top surface 26 is moved out of alignment by this adjustment of the second portion of top surface 26, so the last motor, whose corresponding third portion of top surface 26 is still too low to block the corresponding detector, is deactivated, and the first two portions of top surface 26 now are adjusted iteratively, using the first two motors, until both corresponding detectors receive only half the originally received intensity. The last motor now is reactivated, and continues to extend the corresponding leg until the intensity received by the remaining detector is equal to half of the original received intensity, indicating, as in the cases of the other two portions of top surface 26, that the corresponding portion of top surface 26 now is at a point displaced from domain 40 by displacement 42. In general, this moves the first two portions of top surface 26 out of alignment, so all three motors 27, 27' and 27" now are activated successively in the proper directions to align all three portions of top surface 26 iteratively. When this iterative alignment process converges, the three portions of top surface 26 are below domain 40 by displacement 42, so the portion of top surface 24 that is below y-motion arm 14 is both parallel to domain 40 and below domain 40 by displacement 42, as required.

The application of the image to top surface 26 now is effected substantially as described in the Kitos patent, applying edible colorants to top surface 26 at all desired values of the y-coordinate of print head 10 for the initial value of the x-coordinate. y-motion arm 14 and print head 10 now are moved to the next desired x-coordinate, the iterative alignment process is repeated, and the edible colorants are applied to top surface 26 at all desired values of the y-coordinate. This is repeated until top surface 26 is decorated at all desired (x,y) coordinates.

It will be appreciated that this preferred embodiment of the apparatus of the present invention can be used to decorate cakes whose top surfaces either are flat or are curved convexly upward only in the x-direction. If top surface 26 is flat, then the iterative process described above, for aligning top surface 26 with y-motion arm 14, aligns top surface 26 parallel to all of domain 40 and displaced downward from domain 40 by displacement 42. The only possible exceptions to this may arise when y-motion arm 14 is positioned over the edges of cake 24, where cake 24 may partially block all three beams 36, 36' and 36" with top surface 26 tilted with respect to domain 40; but this situation is easily avoided by suitably bounding the motion of y-motion arm 14 in the x-direction. If top surface 26 is curved convexly upward, then the iterative process described above aligns, parallel to domain 40 and displaced downward from domain 40 by displacement 42; only that portion of top surface 26 that is directly below y-motion arm 14, but this is all that is necessary to position cake 24 relative to print head 10 properly for applying the image to top surface 26 at each value of the x-coordinate of print head 10.

Figure 6:
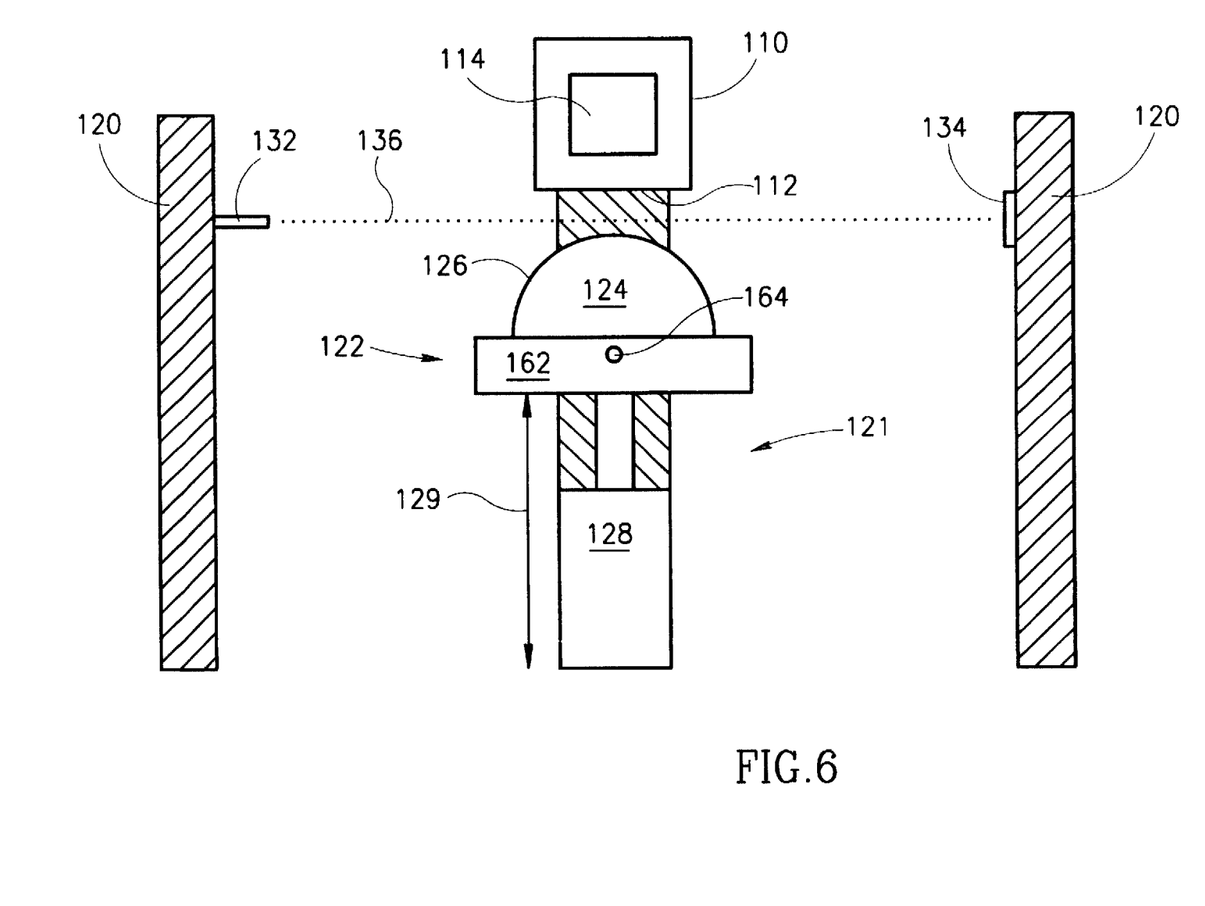
FIG. 6 is a frontal schematic view of a second embodiment of the apparatus of the present invention.
Figure 7:
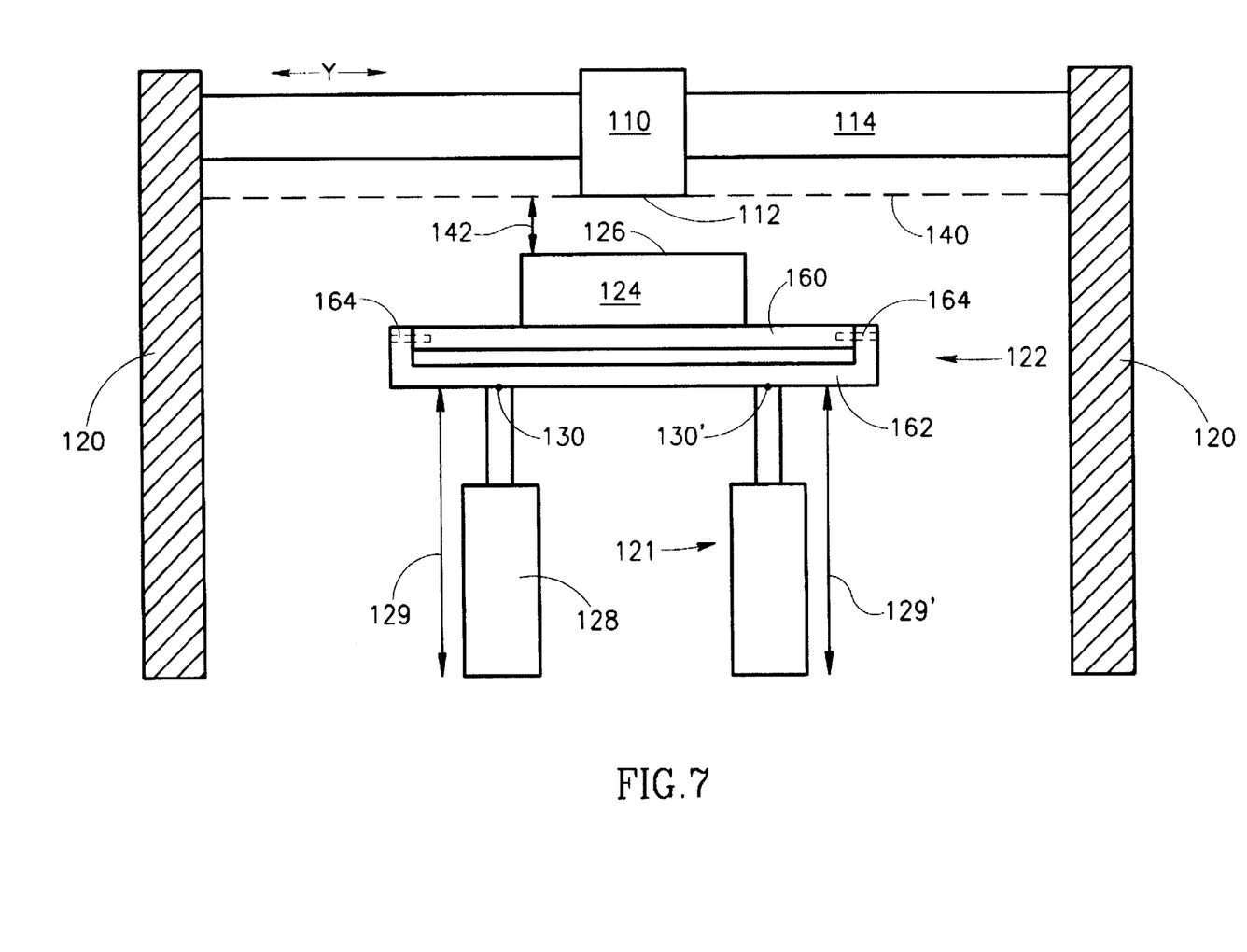
FIG. 7 is a partial side schematic view of the apparatus of FIG. 6.
Figure 8:
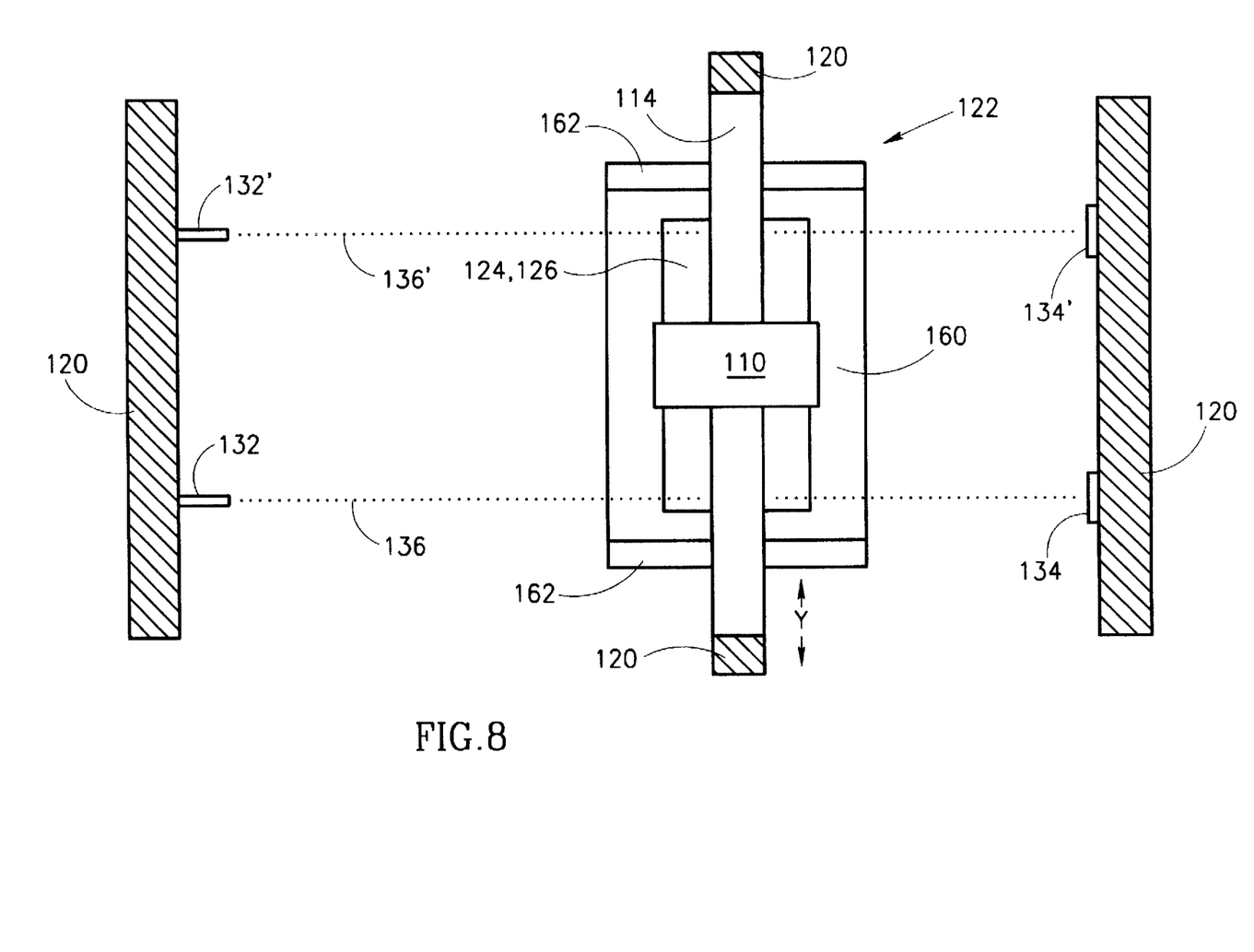
FIG. 8 is a top schematic view of the apparatus of FIG. 6.

FIG. 6 is a frontal schematic view of a second preferred embodiment of a cake decorating apparatus according to the present invention; FIG. 7 is a partial side schematic view of the apparatus of FIG. 6; and FIG. 8 is a top schematic view of the apparatus of FIG. 6. A print head 110, substantially identical to print head 10, is supported by a positioning mechanism that consists only of an arm 114 that is substantially identical to y-motion arm 14 and that is supported by a frame 120. Print head 110 is movably attached to arm 114 and moves along arm 114 in the y-direction. The positioning mechanism serves to position print head 110 laterally in the y-direction only, so that the bottom surface 112 of print head 110 may be placed within a linear domain of points that is represented in FIG. 7 by a dashed line 140.

A half-cylindrical roll cake 124, having a top surface 126 with a semicircular cross section, is supported below domain 140 by a support mechanism 121 so that the cylindrical axis of symmetry of cake 124 is aligned with the y-direction and top surface 126 is parallel to domain 140 and below domain 140 by a displacement 142 substantially equal to displacement 42. Support mechanism 121 includes a table 122 on which cake 124 rests, and two legs 128 and 128' having adjustable lengths 129 and 129' respectively. Legs 128 and 128' are pivotably attached to table 122 at attachment points 130 and 130' respectively. Unlike attachment points 30, 30' and 30", on which table 22 can pivot in both lateral directions, attachment points 130 and 130' permit table 122 to pivot only in the y-direction. Table 122 consists of an upper portion 160 and a lower portion 162 that are connected by pivots 164 which permit upper portion 160 to tilt in the x-direction. Legs 128 and 128' constitute a leveling mechanism: lengths 129 and 129' are adjusted, in a manner similar to that used to adjust lengths 29, 29' and 29" of legs 28, 28' and 28", to position top surface 126 parallel to domain 140 and below domain 140 by displacement 142. Upper portion 160 and pivots 164 constitute a tilting mechanism whose function is described below.

The attitude of top surface 126 with respect to domain 140 is sensed by a sensing mechanism that includes two sources 132 and 132' of pulsed and collimated beams 136 and 136' of light, and two detectors 134 and 134' that respond to incident light. As in the case of sources 32, 32' and 32", sources 132 and 132' preferably are lasers. As in the case of detectors 34, 34' and 34", detectors 134 and 134' preferably are photodiodes. Sources 132 and 132' and detectors 134 and 134' are rigidly attached to frame 120 so that source 132 aims beam 136 at detector 134, with beam 136 passing directly above attachment point 130 and below domain 140 by displacement 142; and so that source 132' aims beam 136' at detector 134', with beam 136' passing directly above attachment point 130' and below domain 140 by displacement 142. Note that for clarity, the portions of frame 120 that bear sources 132 and 132' and detectors 134 and 134' are not shown in FIG. 8.

As noted above, arm 114 moves print head 112 only in the y-direction. Scanning of top surface 126 in the x-direction is obtained by tilting upper portion 160 and cake 124: tilting a cake of radius r by an angle $\phi$ (in radians) moves cylindrical top surface 126 a distance $r\phi$ in the x-direction.

The system for sensing and adjusting the attitude of cake 124 with respect to domain 140 is similar to the system described above, in connection with FIG. 5, for adjusting the attitude of cake 24 with respect to domain 40, except that there are only two legs, two sources, two detectors and two amplifiers. The method for adjusting the attitude of cake 124 with respect to domain 140 also is similar to the method described above for adjusting the attitude of cake 24 with respect to domain 40, with the important difference that, because beams 136 and 136' pass directly above attachment points 130 and 130', respectively, the adjustment process in this case need not be iterative. Instead, as legs 128 and 128' are extended from their shortest positions, as soon as one of detectors 134 or 134' receives only half of the initial intensity of the corresponding beam 136 or 136', the corresponding stepping motor is deactivated, and only the other stepping motor continues to extend the corresponding leg. As the other leg continues to lengthen, table 122 pivots about the attachment point of the now stationary first leg, so the portion of top surface 126 directly above the first leg remains displaced by displacement 142 from domain 140 as the second leg continues to lengthen.

While the invention has been described with respect to a limited number of embodiments, it will be appreciated that many variations, modifications and other applications of the invention may be made.

What is claimed is:

1. An apparatus for decorating a cake having a top surface, comprising:

(a) a movable print head;

(b) a positioning mechanism supporting said movable print head, wherein said positioning mechanism is operative to selectable position said print head at a plurality of positions which define a domain wherewithin said print head moves;

(c) a support mechanism for supporting the cake below said movable print head, said support mechanism including a leveling mechanism for adjusting said support mechanism so that at least a portion of the top surface of the cake is substantially parallel to said domain and displaced from said domain by a certain displacement; and (d) a sensing mechanism connected to said leveling mechanism, for sensing whether said position of the top surface of the case is substantially parallel to said domain and displaced from said domain by said displacement, said leveling mechanism being responsive to said sensing mechanism.

2. The apparatus of claim 1, wherein said support mechanism includes a substantially flat table, and wherein said leveling mechanism includes at least two legs supporting said table.

3. The apparatus of claim 2, wherein said sensing mechanism includes at least two sources of collimated beams of light and at least two detectors, each of said sources being positioned opposite to a corresponding one of said detectors with respect to said table, so that said collimated beam passes below said domain at said displacement and is incident on said detector.

4. The apparatus of claim 3, wherein said sources of light are lasers.

5. The apparatus of claim 3, wherein said detectors are photodiodes.

6. The apparatus of claim 3, wherein each of said legs is attached to said table at an attachment point, and wherein each of said collimated beams passes above one of said attachment points.

7. The apparatus of claim 3, further comprising:

(f) a frame, having a fixed position relative to said domain, whereto said light sources and said detectors are rigidly attached.

8. The apparatus of claim 2, wherein said support mechanism includes a tilting mechanism for tilting the case with respect to said domain.

9. The apparatus of claim 2, wherein said domain is a substantially horizontal planar shape.

10. The apparatus of claim 2, wherein said leveling mechanism includes three legs supporting said table, and wherein said sensing mechanism includes three sources of collimated beams of light and at least three detectors, each of said sources being positioned opposite to a corresponding one of said detectors with respect to said table, so that said collimated beam passes below said domain at said displacement and is incident on said detector.

11. The apparatus of claim 10, wherein said sources of light are lasers.

12. The apparatus of claim 10, wherein said detectors are photodiodes.

13. The apparatus of claim 10, wherein one of said sources and a corresponding one of said detectors are rigidly attached to said positioning mechanism.

14. The apparatus of claim 10, further comprising:

(f) a frame having a fixed position relative to said domain, two of said sources and two of said corresponding detectors being rigidly attached to said frame.

* * * * *